Sept. 17, 1957     J. H. REES     2,806,581
AUTOMOBILE FRAME HANDLING MEANS AND METHOD
Filed March 23, 1954     3 Sheets-Sheet 1
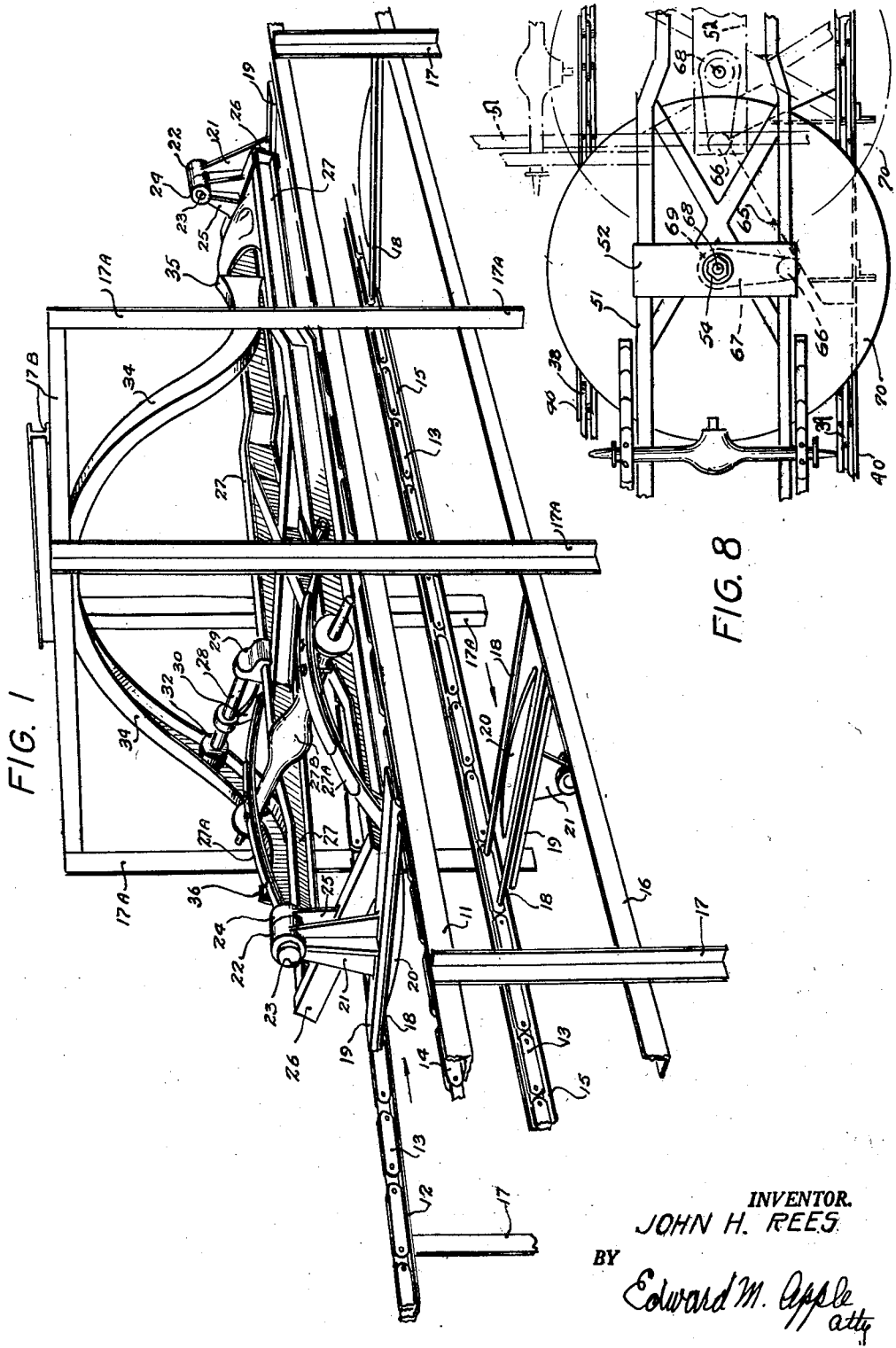
INVENTOR.
JOHN H. REES
BY Edward M. Apple
atty

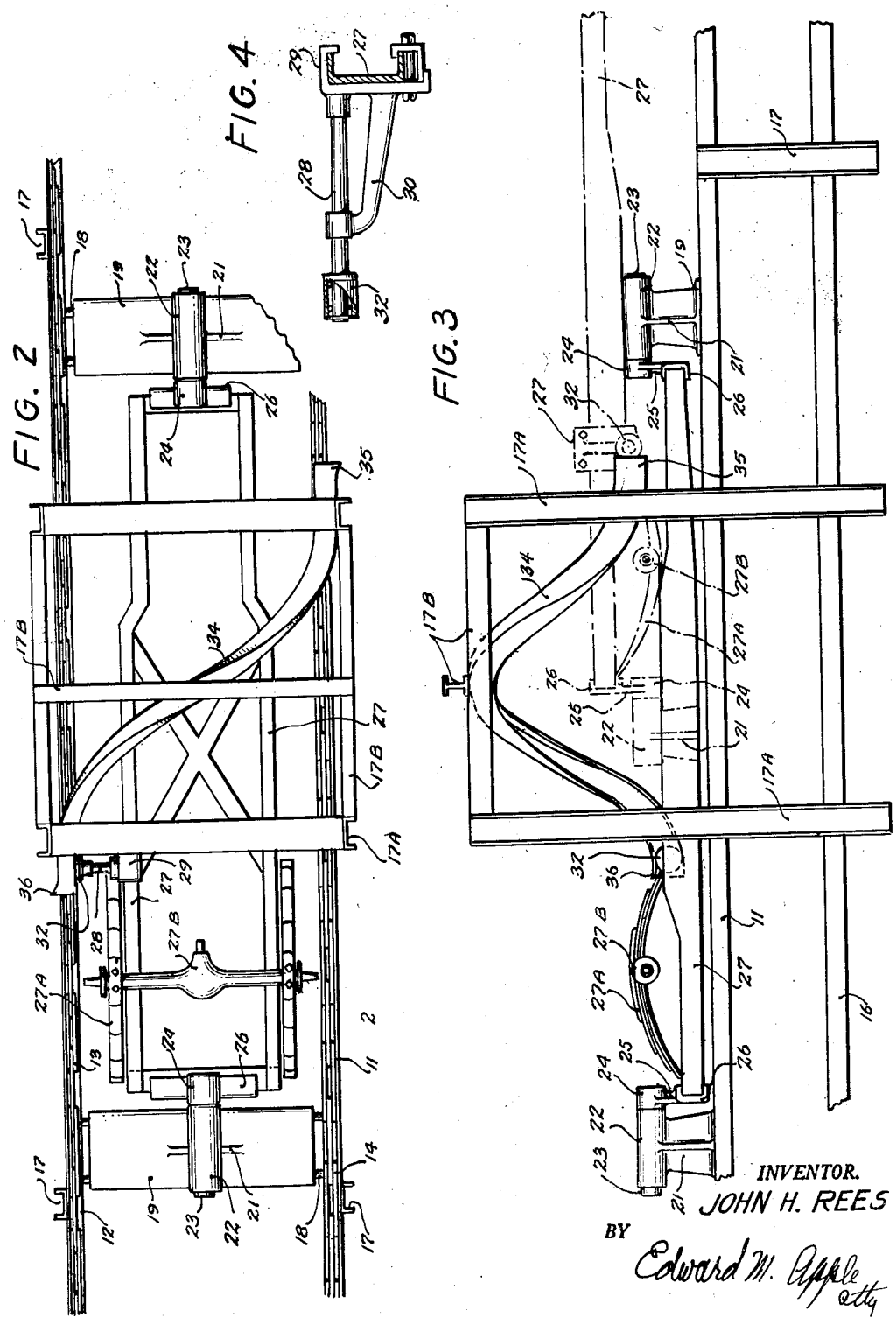

Sept. 17, 1957 J. H. REES 2,806,581
AUTOMOBILE FRAME HANDLING MEANS AND METHOD
Filed March 23, 1954 3 Sheets-Sheet 3
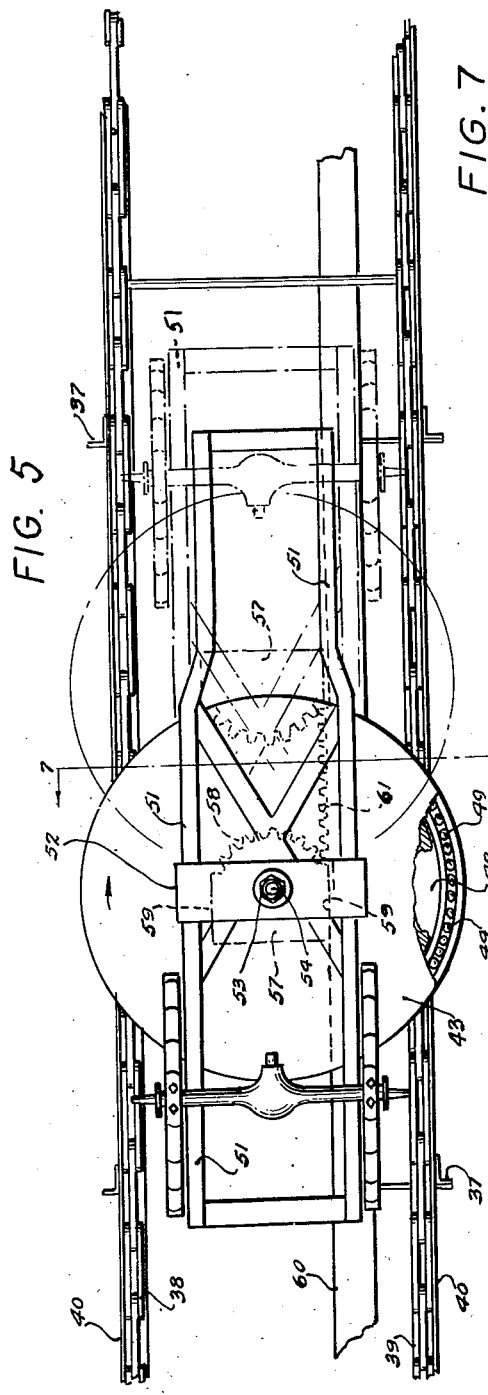
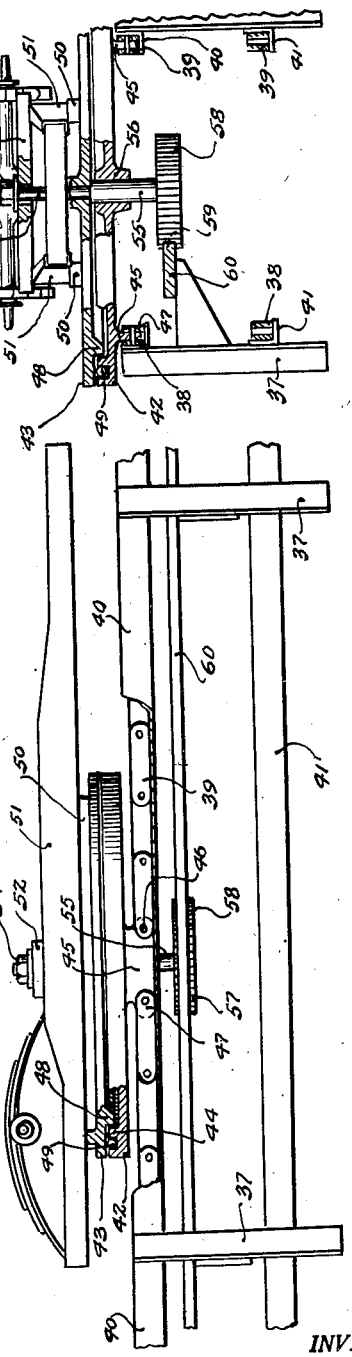
INVENTOR.
JOHN H. REES
BY
Edward M. Apple
Atty

United States Patent Office 2,806,581
Patented Sept. 17, 1957

2,806,581

AUTOMOBILE FRAME HANDLING MEANS AND METHOD

John H. Rees, Detroit, Mich.

Application March 23, 1954, Serial No. 418,113

6 Claims. (Cl. 198—33)

This invention relates to material handling, and has particular reference to a method and means for handling automobile frames and the like, during the assembling of the automobile.

In present practice in the automobile industry, the heavy frames are carried along on endless conveyors, while workmen secure thereto the various parts needed to complete the assembly. In certain operations it is necessary to invert the frames, and in others the frames must be turned end for end. Because of the weight and bulky nature of the frames, such operations are extremely difficult and awkward to handle, and heretofore various means and methods have been devised for performing these operations, all of which have left much to be desired so far as the end results are concerned.

It is, therefore, an object of this invention to provide a novel method and means for conveying an automobile frame or the like along an assembly line.

Another object of the invention is to generally improve material handling methods and to provide a device of the character indicated which is simple in construction, economical to manufacture, and efficient in use.

Another object of the invention is to provide a method and means for utilizing the existant power in a conveyor operation to turn, roll, up-end, or otherwise change the direction of travel or position of an article, or a piece of material, which is being transported on such conveyor.

By utilizing the existing or contemplated power of the conveyor in the method as indicated, I am able to provide, among other advantages, the following:

(a) The elimination of presently used hydraulic and pneumatic cylinders, auxiliary motors, drive chains and sprockets, and complicated electric or electronic instruments.

(b) Continuity of operation, as there is no necessity to stop the conveyor while rolling or turning over the article or part being conveyed.

(c) The conservation of factory floor space and a greatly increased production with a corresponding saving of man power and driving power.

(d) Improved safety and accuracy of operation.

(e) Initial savings in cost of installation and operation.

(f) With a comparatively simple mechanism and this method, I am able to roll over, through 180°, an automobile frame, cylinder block, or other automobile parts, as well as boxes, crates, or other articles, or I may turn in either a horizontal or vertical plane, any of these articles through any degree from 1° to 360°, or I may raise or lower in transit any of these articles.

The foregoing and other objects and advantages of the invention will become more apparent as the description proceeds, reference being made from time to time to the accompanying drawing, in which drawing:

Fig. 1 is a fragmentary view, in perspective, of a device embodying the invention, and illustrating the manner in which an automobile frame may be handled. In this embodiment, the frame is to be rotated on its longitudinal axis 180°.

Fig. 2 is a top plan view of the device illustrated in Fig. 1.

Fig. 3 is a side elevational view of the device shown in Fig. 1, and showing the frame (in dotted lines) after it has been rotated 180°.

Fig. 4 is an enlarged detail, in elevation, showing one of the guide arms used on each frame.

Fig. 5 is a top plan view of a modified form of the device, with which an automobile frame may be turned end to end in a horizontal plane, and shows the frame (in dotted lines) after it has been turned end to end.

Fig. 6 is a side elevational view of the device shown in Fig. 5.

Fig. 7 is a section taken substantially on the line 7—7 of Fig. 5.

Fig. 8 is a fragmentary top plan view of another modified form of the device.

Referring now more particularly to the drawing, it will be understood that in the embodiment herein disclosed, the reference characters 11 and 12 indicate lengths of angle iron which serve as the upper run and supports for the conveyor chains 13 and 14, which chains are continuous and are reversed in direction by passing them over power driven sprockets (not shown) as in conventional practice. The runs 11, 12, 15 and 16 are supported by means of angle iron supports 17 and 17A, which rest on the floor, and which are secured, by welding or other suitable means, to the runs 11, 12, 15 and 16. Extending between the chains 13 and 14 are spaced bars 18, the ends of which are reduced and rounded to serve as pivot pins which extend through openings in the links of the chain. Secured by welding, or other suitable means, to each pair of spaced rods 18, is a plate 19, which has a depending reinforcing rib 20 which extends between the rods 18. Mounted on top of the plate 19 is a support 21, at the end of which is mounted a trunnion bearing 22, through which bearing 22 extends a pin 23, the extended end of which serves as a pivot for a bearing 24, which is mounted at the end of a hanger 25, which is provided with cross member 26 (Figs. 1 and 3). The cross member 26 is preferably of channel shape and is adapted to receive in the channel one end of an automobile frame 27 to which is secured the springs 27A and rear axle 27B. A similar set of elements 18–26 is carried by the chains 13 and 14 at the opposite end of the frame 27, where they are supported on the chains as previously described, whereby the frame is supported at either end along its longitudinal axis. A guide arm 28 (Figs. 1 and 4) is clamped to the left of one of the side rails of the frame 27 and is supported by the adjustable clamp base 29, and is reinforced by a bearing arm 30. At the end of the arm 28 is a roller guide member 31 which is secured against axial movement by any suitable means, such as a washer 32 and a pin 33. The roller 31 is adapted to be received in and travel in a channel member 34, which serves as a cam. The channel member 34 is secured, by welding or other suitable means, to the upright supports 17A and cross heads 17B. The channel member 34 is bent and rebent into a 180° helix, the trailing end 35 of which is disposed in a higher plane than the leading end 36, so that when the frame 27 has been rotated 180° about its longitudinal axis, the changed elevation of the upper surface of the frame is compensated for. With the use of the method and a structure of the type just disclosed, it is obvious that the assembling of elements on either side of the automobile frame may be greatly facilitated with a minimum of effort, and all may be accomplished within a very small area. Other operations requiring the inverting of a part or element may be performed with similar facility by the same method.

In Figs. 5, 6, and 7, I have illustrated a modified form of the invention by which I am enabled to turn the automobile frame end to end in a horizontal plane.

In this modification, I utilize substantially the same supports 37, and similar chains 38 and 39, which travel in suitable angle iron ways 40 and 41, as previously described. In this embodiment, I provide a turn table consisting of plates 42 and 43, which are supported on suitable ball bearings 44. Depending from the lower plate 42 is a pair of bosses 45 (Figs. 6 and 7) which are shaped to form separate links of the chains 38 and 39. The bosses 45 have transverse bores 46, through which extend the chain pins 47, to which the other links are connected. The upper plate 43 (Fig. 7) has a depending ring 48 which engages a corresponding up-standing ring 49 formed on the lower plate 42, which rings 48 and 49 prevent the lateral displacement of the plates. Supported on the upper surface of the upper plate 43 (Fig. 7) is a pair of guide rails 50, which are adapted to receive the side rails of an automobile frame 51. The frame 51 is held in position on the rails 50 by means of a cross member 52 having a central bore 53, in which is received an extension 54 of an axle 55, which axle 55 is secured for rotation with the top plate 43 and is journaled for rotation in the lower plate 42 as at 56. An indexing plate 57 (Fig. 5) having a toothed segment 58 is secured to the lower end of the shaft 55 and is rotatable therewith. The guide plate 57 has straight side edges 59, which are adapted to slide along the guide rail 60, which rail has a rack like section 61 (Fig. 5) at spaced intervals, whereby upon being contacted by the toothed segment 58 causes the guide plate 57 and segment 58 to rotate on the axle 55, whereby the frame 51 is turned end to end in a horizontal plane.

In Fig. 8, I disclose a further modified form of the invention. In this modification, the cam 65 is positioned in a horizontal plane and is arranged to be engaged by a roller 66 carried at the end of a guide arm 67, which in this embodiment is secured to the extension 68 of the axle 69, which actuates the rotatable plate 70 on which is mounted the automobile frame 51 which is held in position on the plate 70 by means of the plate 52. The cam 65 and the roller and arm 67 working together will rotate the plate 70 and the frame 51 approximately 90° as shown by the dotted lines in Fig. 8. In this embodiment, the conveyor chains 38 and 39, and their support 40, function as previously described in connection with Fig. 5.

The device functions as follows:

In the embodiment shown in Figs. 1, 2, 3, and 4, the conveyor chains 13 and 14 travel in the direction indicated by the arrows in Fig. 1. That is, the chains 13 and 14 travel to the right on the upper members 11 and 12, and are returned to the left on the lower members 15 and 16. As previously described, the chains 13 and 14 carry with them the frame supporting elements 18 to 26 inclusive, which elements support the frame 27 in a manner that it may be rotated on an axis parallel with the longitudinal axis of the frame. As the conveyor chains 13 and 14, and the frame supporting elements with the frame secured thereto, move to the right with the chains 13 and 14, the roller 32 is received in the channel cam member 34, which, as previously described, is in the form of a helix so that as the roller travels in the channel with the member 34, it causes the swinging of the arm 28 in a corresponding helix with a consequent turning over of the frame as shown by the dotted lines in Fig. 3.

In the embodiment shown in Fig. 5, the chains 38 and 39 travel from left to right, carrying with them the frame carrying turn table, to the upper plate of which is secured the automobile frame 51. As the assembly moves from left to right, as shown in Fig. 5, the lowermost tooth of the segment 58 engages the first tooth of the rack 61, causing the members 57 and 58 to rotate about the axis 54, so that when the segment 58 has completed its engagement with the rack 61 the member 57 will have completed a rotation of 180°. By the same token, the frame 51 will have been turned end for end, as shown by the dotted lines to the right of Fig. 5.

The modification shown in Fig. 8 functions in a manner similar to that shown in Fig. 5, except that in this embodiment, a guide arm 67 with the roller 66 is employed to engage the horizontally directed cam 65, which elements are used in place of the guide plate 57, toothed segment 58, and rack 61 shown in Fig. 5.

Although I have herein disclosed certain embodiments of the invention, it will be understood that various modifications can be made by re-arranging and modifying the elements. For example, a separate source of power independent of the inherent power of the conveyor might be employed to move the frame, or part to be conveyed, through the helix or cam action during the continuous travel of the conveyor, and in synchronized timing therewith, all of which is within the contemplation of the invention, and intended to be covered by the appended claims.

Having described my invention, what I claim and desire to secure by Letters Patent is:

1. A device of the character described for handling an automobile frame comprising in combination, a power driven conveyor line, formed of spaced chains, tracks for supporting said chains, cross members secured at either end and at spaced intervals to said chains, uprights on said cross members, said uprights having bearing elements for receiving mating bearing elements carried on the said frame, whereby said frame is supported for rotation about its longitudinal axis, a channel shaped helical cam member supported at one end adjacent one of said tracks, and supported at the other end adjacent the other of said tracks, and a cam follower removably attached to said frame and arranged to be received in said channel shaped cam member.

2. The structure of claim 1, including spaced tracks for supporting the return portions of said chains.

3. The structure of claim 1, including spaced tracks for supporting the return portions of said chains; said cross members and said uprights in inverted position.

4. The structure of claim 1, in which said chains and said tracks are spaced apart a sufficient distance to permit said frame to rotate therebetween.

5. The structure of claim 1, in which said cam has an undulation of sufficient depth to permit said frame to rotate therein.

6. The structure of claim 1, in which said cam follower includes a rotatable member which travels in said channel.

References Cited in the file of this patent

UNITED STATES PATENTS

| | | |
|---|---|---|
| 1,096,075 | Traver | May 12, 1914 |
| 1,653,495 | Cereghino | Dec. 20, 1927 |
| 1,876,066 | Logan | Sept. 6, 1932 |
| 2,355,597 | Pond | Aug. 8, 1944 |
| 2,474,984 | Pioch | July 5, 1949 |
| 2,508,259 | Helme | May 16, 1950 |
| 2,597,914 | Whitworth | May 27, 1952 |
| 2,619,916 | Rainier | Dec. 2, 1952 |